United States Patent
Koifman

[19]

[11] Patent Number: 6,130,548
[45] Date of Patent: Oct. 10, 2000

[54] SIGNAL CONVERTING RECEIVER HAVING CONSTANT HYSTERESIS, AND METHOD THEREFOR

[75] Inventor: Vladimir Koifman, Rishon-Lezion, Israel

[73] Assignee: Motorola Inc., Schaumburg, Ill.

[21] Appl. No.: 09/350,642

[22] Filed: Jul. 9, 1999

[51] Int. Cl.[7] .................................................. H03K 17/16
[52] U.S. Cl. .................................. 326/21; 326/82; 326/86
[58] Field of Search ................................. 326/21, 23, 82, 326/83, 86

[56] References Cited

U.S. PATENT DOCUMENTS

| | | | |
|---|---|---|---|
| 5,559,448 | 9/1996 | Koenig | 326/86 |
| 5,767,698 | 6/1998 | Emeigh et al. | 326/83 |
| 5,977,796 | 11/1999 | Gabara | 326/86 |
| 5,977,797 | 11/1999 | Gasbarik | 326/86 |
| 5,994,921 | 11/1999 | Hedberg | 326/83 |
| 6,072,943 | 6/2000 | Gasparik et al. | 326/86 |

OTHER PUBLICATIONS

"Draft Standard for Low–Voltage Differential Signals (LVDS) for Scalable Coherent Interface (SCI)", Draft 1.3, Nov. 27, 1995, IEEE P1596.3–1995, pp. 1–34.

Primary Examiner—Trong Phan

[57] ABSTRACT

A LVDS receiver (200) converts a differential input signal (15) at an input (201/202, e.g., voltage difference $V_1-V_2$) to a single output signal (20) at an output (295). The receiver (200) has a signal distributor (205), first and second transistor pairs (220,210), a combiner (260), and an output trigger (250). The distributor (205) either forwards the differential input signal (15) to the first transistor pair (220) when the common mode portion of the input signal (15, e.g., $V_{CM}=(V_1+V_2)/2$) of the first and second input signal components is in a first magnitude range (e.g., $V_{CM}>V_{REF}$) or to the second transistor pair (210) when the common mode portion is in a second, different magnitude range (e.g., $V_{CM}<V_{REF}$). The transistors of both pairs (210 and 220) are of the same conductivity type. This approach provides substantially constant input transconductances ($g_m$) over the whole common mode input signal range.

19 Claims, 5 Drawing Sheets

- *PRIOR ART* -

SIGNAL CONVERTING RECEIVER HAVING CONSTANT HYSTERESIS, AND METHOD THEREFOR

FIELD OF THE INVENTION

The present invention generally relates to electronic circuits, and, more particularly, to receivers receiving data from differential data transmission lines and to a method therefor.

BACKGROUND OF THE INVENTION

In modern electronic systems, such as computers, telephone exchanges and others, data has to be transmitted, for example, between integrated circuits (ICs) located on a printed circuit board (PCB) or between different boards. To achieve a high transmission speed while keeping power dissipation low, differential data lines are getting more and more importance. A transmitter sends differential signals to differential data lines. A receiver forwards the differential signal to further circuitry. As it will be explained with more detail below, the receiver has to accommodate common mode (CM) fluctuations of the differential signal at its inputs; to correctly recognize incoming signals despite a voltage drop across the lines; and to forward the signals with a hysteresis which is independent from CM signal components.

As it will be explained in the following, prior art receivers suffers from certain disadvantages. The present invention seeks to provide an improved receiver stage which mitigates or avoids these and other disadvantages and limitations of the prior art.

DETAILED DESCRIPTION OF A PREFERRED EMBODIMENT

In the following, the term "transistor" is intended to include any device having at least two main electrodes (e.g., drain D and source S) and a control electrode (e.g., gate G). The impedance between the main electrodes is controlled by a signal applied to the control electrode. Which electrode is the drain D and which is the source S, depends on the applied voltages, so D and S are distinguished here only for the convenience of explanation.

Preferably, a preferred embodiment of the present invention is implemented with field effect transistors (FETs) in well known CMOS technology. The terms "first type" (e.g., N-FETs or P-FETs) and "second type" (e.g., P-FETs or N-FETs) are intended to distinguish complementary transistors of opposite conductivity. "First type" and "second type" can refer to either N-FETs or P-FETs, as the case may be. For convenience, the figures symbolize P-FETs by a circle at the gate. Persons of skill in the art are able, without the need of further explanation herein, to revert the transistor conductivities (i.e., using P-FETs for N-FETs and vice versa). A "conductive" transistor is able to carry a current between its main electrodes; whereas a "non-conductive" transistor is substantially not able to carry a current.

The term "scale" and its variations are intended to indicate predetermined and substantially constant magnitude relations between currents, voltages or transistor dimensions. For example, first and second transistors can have first and second current conduction paths (e.g., drain—source), respectively, which are in a predetermined magnitude ratio to each other. Hence, when the same control signal is applied at the control electrodes of both transistors, the transistor currents are related by the same ratio. Similarly, a first current can be a replica of a second current when first and second currents are related by a predetermined ratio.

Figure 1:
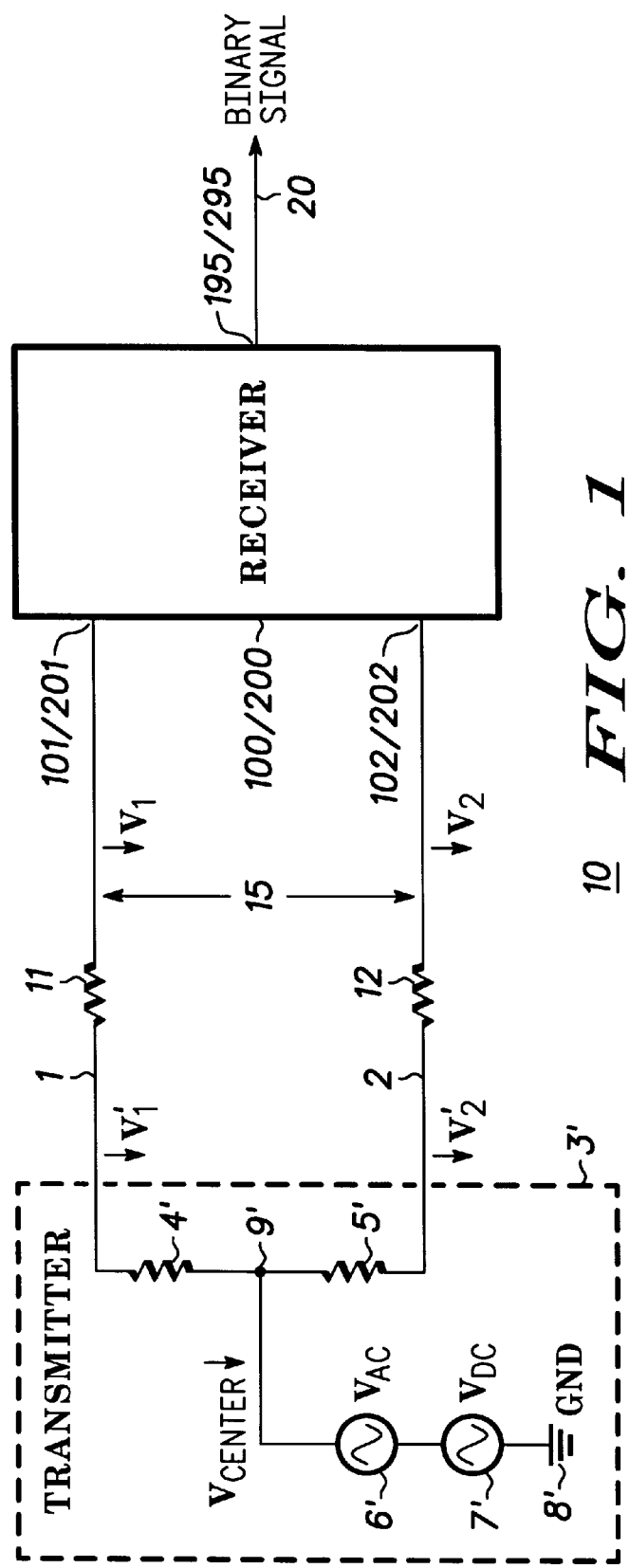
FIG. 1 illustrates a simplified block diagram of a data transmission system according to the LVDS standard.

FIG. 1 illustrates a simplified block diagram of data transmission system 10 according to the "Draft Standard for Low-Voltage Differential Signals (LVDS) for Scalable Coherent Interface (SCI)", Draft 1.3 IEEE P1596.3-1995.

System 10 comprises lines 1 and 2, transmitter 3' and receiver stage 100/200. Receiver stage 100 of the prior art will be explained in connection with FIG. 3; and receiver stage 200 according to the present invention will be explained in connection with FIGS. 4–6.

For convenience, prime markers are added to reference numbers and other abbreviations relating to transmitter 3'. Transmitter 3' (or "driver", dashed frame) comprises an output stage illustrated here by symmetrically arranged resistors 4' and 5' (each having equal values, e.g., $R_1' = R_2' = 50\ \Omega$) and voltage sources 6' and 7'.

Line voltages $V_1'$ and $V_2'$ are defined to ground 8' (e.g., potential GND ≈zero). A voltage swing $\Delta V'$ is defined as being positive. The terminating voltage $V_{CENTER}'$ is defined between node 9' (coupling resistors 4' and 5') and ground 8' (potential GND).

Transmitter 3' provides a differential signal to lines 1 and 2. The signal has first and second logical values (differential mode (DM) transmission). Transmitter 3' either (a) simultaneously pulls lines 1 and 2 to $$V_1' = (V_{RATED}' + |\Delta V'|), \text{ and} \quad (2)$$

$$V_2' = (V_{RATED}' - |\Delta V'|),$$

or (b) simultaneously pulls lines 1 and 2 to $$V_1' = (V_{RATED}' - |\Delta V'|), \text{ and} \quad (4)$$

$$V_2' = (V_{RATED}' + |\Delta V'|).$$

Convenient values for rated voltages are $V_{RATED}' = 1200$ mV (milli volts). The || symbols stand for absolute values. The voltage swing is conveniently $|\Delta V'| \leq 250$ mV ($|\Delta V_{MAX}'| = 250$ mV). In other words, in case (a), the positive voltage difference $$(V_1' - V_2') = |2 * \Delta V'| \quad (6)$$

represents a first logical value (e.g., logical "1"); and in case (b), the negative voltage difference $$(V_1' - V_2') = -|2 * \Delta V'| \quad (8)$$

represents a second, opposite logical value (e.g., logical "0").

Voltage $V_{CENTER}$ at node 9' can have the following time function:

$$V_{CENTER}'(t)=V_{DC}'+V_{AC}'*\sin(2*\pi*F*t) \quad (10)$$

Usual values are $V_{DC}'=V_{RATED}'$ and $V_{AC}'=V_{RATED}'$ (a.c. amplitude). The fluctuation frequency F can have magnitudes from substantially zero to about 1000 MHz.

Lines 1 and 2 each have a physical length of several meters (maximum about 10 meters). Due to line resistance 11 in line 1 and resistance 12 in line 2, the voltage differences between lines 1 and 2 at inputs 101/201 and 102/202 of receiver 100/200 are smaller than at the output of transmitter 3' ($|\Delta V| \leq |\Delta V'|$). Or, in other words, the line voltages (in reference to ground) are reduced ($V_1 < V_1'$, $V_2 < V_2'$). Difference values at the receiver inputs are:

$$V_1-V_2=\pm|2*\Delta V| \quad (12)$$

with $|2*\Delta V|=100$ mV being a typical value.

Receiver 100/200 receives differential signal 15 (represented by line voltages $V_1$ at line 1 and $V_2$ at line 2) at inputs 101/201 and 102/202 and provides binary output signal 20 at output 195/295 to further circuitry (not illustrated). In other words, receiver 100/200 converts a first binary signal having differential form (e.g., signal 15, $V_1-V_2$) to a second binary signal (i.e. signal 20) having a form corresponding to the further circuitry (e.g., TTL level) without changing the logical values.

System 10 can conveniently transmit changes between the logical values of signals 15 at data rates up to 250 megabit per second (MBs). Higher rates, e.g., up to 850 MBs (or even higher) are also possible.

Figure 2:
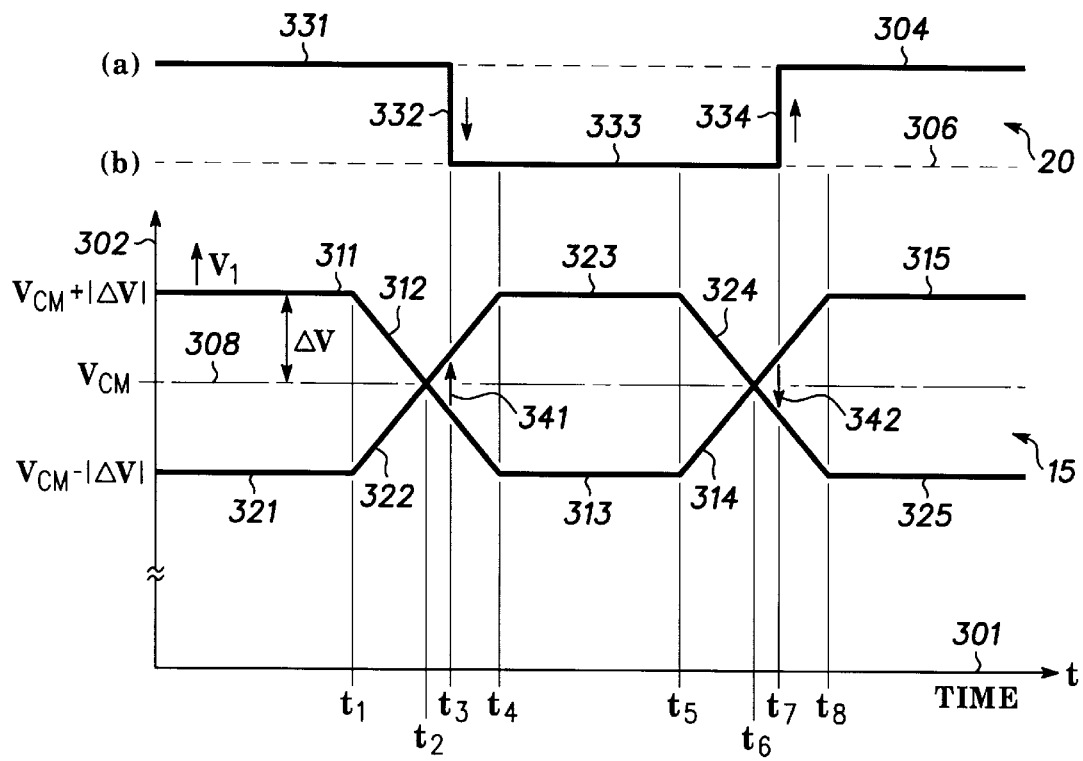
FIG. 2 illustrates a simplified time diagram of a line signal and of an output signal in the system of FIG. 1.

FIG. 2 illustrates simplified time diagram 300 of differential signal 15 (voltages $V_1$ and $V_2$) and binary output signal 20. Horizontal axis 301 is the common time axis; vertical axis 302 indicates voltages $V_1$ and $V_2$; and dashed horizontal lines 304 and 306 indicate first logical value (a) and second logical value (b) of output signal 20.

Common mode (CM) voltage $V_{CM}$ at receiver inputs 101/201 and 201/202 is defined as the arithmetic average between $V_1$ and $V_2$, that is:

$$V_{CM} = \frac{(V_1 + V_2)}{2} \quad (14)$$

Diagram 300 illustrates $V_{CM}$ by horizontal dash-point line 308.

Traces 311–315 illustrate voltage $V_1$; and traces 321–325 illustrate voltage $V_2$. For time t<$t_1$, the voltages are constant ($V_1=V_{CM}+|\Delta V|$, trace 311, $V_2=V_{CM}-|\Delta V|$, trace 321) and signal 20 remains unchanged (at logical (a), trace 331).

In a first signal transition during the interval between $t_1$ and $t_4$, $V_1$ decreases (to $V_1=V_{CM}-|\Delta V|$, trace 312) and $V_2$ increases (to $V_2=V_{CM}+|\Delta V|$, trace 322). Signal 20 does not toggle at $t_2$ when $V_1=V_2$, but toggles only at $t_3$ when $$V_1 - V_2 = -\text{factor}*|\Delta V| \quad (16)$$

$$= -25 \text{ mV (example)} \quad (18)$$

as indicated by arrows 332 and 341. During $t_4$ and $t_5$, the voltages are constant again (trace 313 for $V_1$, trace 323 for $V_2$) and signal 20 remains unchanged (trace 333).

In a second signal transition between $t_5$ and $t_8$, $V_1$ increases (to $V_1=V_{CM}+|\Delta V|$, trace 314) and $V_2$ decreases (to $V_2=V_{CM}-|\Delta V|$, trace 324). Signal 20 does not toggle at $t_6$ when $V_1=V_2$, but toggles only at $t_7$ when $$V_1 - V_2 = \text{factor}*|\Delta V| \quad (20)$$

$$= 25 \text{ mV (example)} \quad (22)$$

as indicated by arrows 334 and 342. From $t_8$, the voltages and signal 20 remain constant.

Due to the changes of voltage $V_{CENTER}$ at transmitter 3' (cf. FIG. 1) and due transmission lines 1 and 2, common mode voltage $V_{CM}$ is also subject to changes, that is:

$$V_{CM\ MIN} \leq V_{CM} \leq V_{CM\ MIN} \quad (24)$$

$$0 \leq V_{CM} \leq 2500\text{mV(for example)} \quad (26)$$

Figure 3:
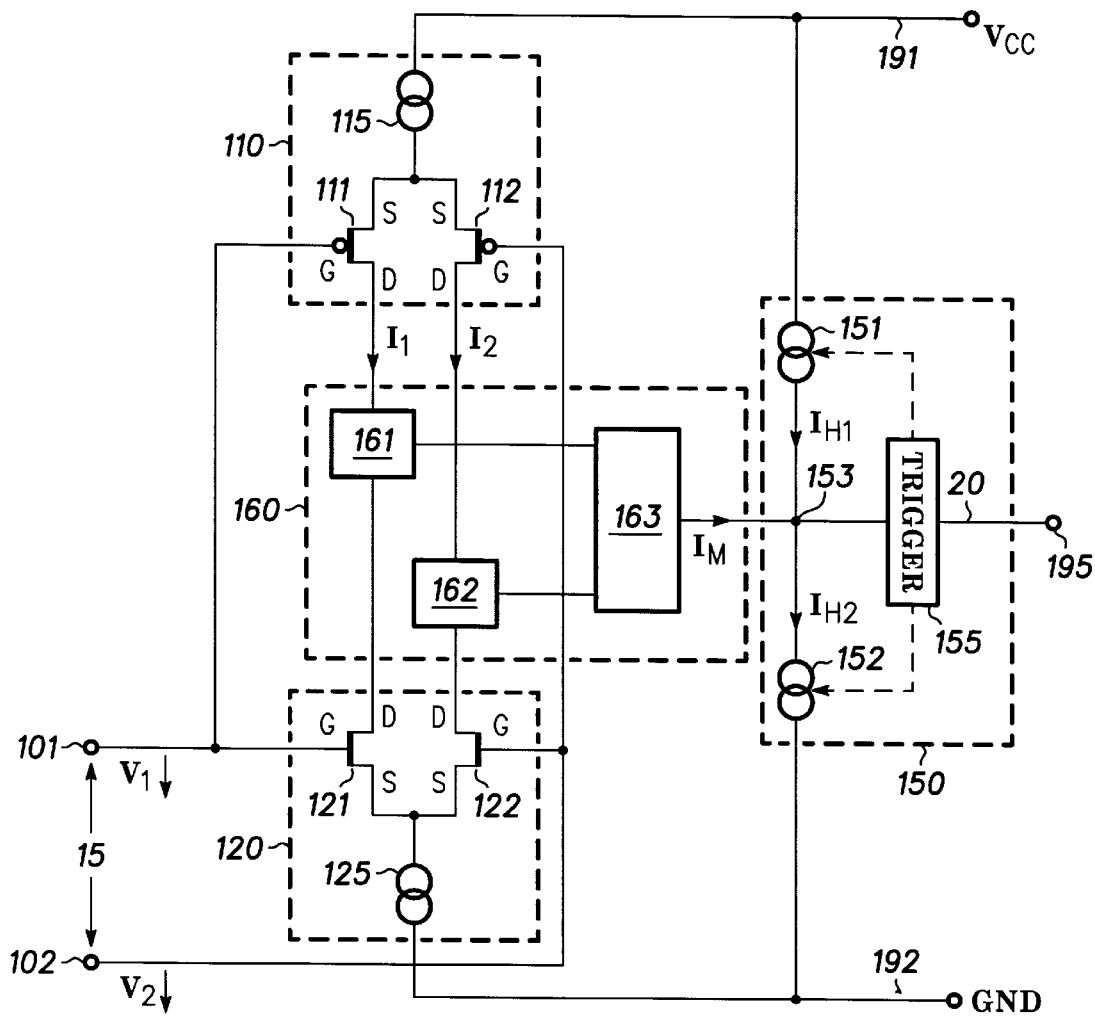
FIG. 3 is a simplified circuit diagram of a receiver stage of the prior art.

FIG. 3 is a simplified circuit diagram of receiver stage 100 of the prior art. Receiver stage 100 comprises input stage 110/120, current combining stage 160 and output stage 150 (dashed frames). Receiver stage 100 is coupled to reference terminals 191 at supply voltage VCC (e.g., VCC≈3.3 volts) and reference terminal 192, preferably, at ground level GND. Receiver stage 100 is coupled to transmission line 1 at input 101 and transmission line 2 at input 102 (cf. FIG. 1) to receive line voltages $V_1$ and $V_2$, respectively (signal 15). Receiver stage 100 provides output signal 20 (cf. FIG. 1) at output 195.

Input stage 110/120 has differential transistor pair 110 with transistors 111 and 112 of the first type (e.g., P-FET) and differential transistor pair 120 with transistors 121 and 122 of the second type (e.g., N-FET). Transistors 111 and 121 have main electrodes serially coupled between reference terminals 191 and 192 to conduct a current $I_1$ in a first path; and transistors 121 and 122 also have main electrodes serially coupled between reference terminals 191 and 192 to conduct a current $I_2$ in a second path. More in detail, current source 115 is coupled between terminal 191 and the sources S of transistors 111 and 112 (pair 110). The drain D of transistor 111 is coupled to the drain D of transistor 121 (first path); and the drain D of transistor 112 is coupled to the drain D of transistor 122 (second path). Direct coupling of the drains is illustrated for simplicity; persons of skill in the art can provide further elements to provide proper operation of the transistors without the need of further explanation herein. The sources S of transistors 121 and 122 (pair 120) are coupled to terminal 192 via current source 125. The gates G of transistors 111 and 121 are coupled together to input 101 (voltage $V_1$); and the gates G of transistors 112 and 122 are coupled together to input 102 (voltage $V_2$). The difference between $V_1$ and $V_2$ results in a difference between drain currents $I_1$ (transistors 111 and 121) and $I_2$ (transistors 112 and 122).

Current combining stage 160 has current mirrors 161 and 162 coupled into current path of input stage 110/120 to provide replica $I_1'=k * I_1$ and replica $I_2'=k * I_2$ (preferably $0.1 \leq k \leq 10$, other values also possible) and has combiner 163 to provide a single measurement current $I_M$ indicating the difference between $I_1$ and $I_2$. In other words, $I_M$ represents—by its magnitude—the information of signal 15. Persons of skill in the art can provide $I_M$ by other means.

Output stage 150 comprises latch 155 ("trigger") and current sources 151 and 152. Preferably, latch 155 receives $I_M$ from combiner 163 at node 153 and provides output signal 20 to output 195. Further, latch 155 controls currents sources 151 and 152. Current source 151 provides current $I_{H1}$ from terminal 191 to node 153; and current source 151 provides current $I_{H2}$ from node 153 to terminal 192. Persons of skill in the art are able to provide hysteresis between $I_M$ at node 153 and signal 20 at output 195, for example, by switching current sources 151 and 152 on and off.

In order to obtain hysteresis between $V_1-V_2$ (signal 15) at inputs 101/102 and signal 20 at output 195 as illustrated on connection with FIG. 2, current $I_M$ should be related to $V_1-V_2$ linearly, that is:

$$I_M = g_m*(V_1-V_2)+\text{offset} \qquad (28)$$

For convenience of explanation, the "offset" is assumed to be zero. For equal input voltages, the current is substantially zero ($V_1=V_2$, $I_M=0$); for a positive difference with a maximum magnitude (i.e., $2* \Delta V_{MAX}$, cf. traces 311 and 321 in diagram 300), the current $I_M$ has a positive maximum value; and for a negative difference with a maximum magnitude (cf. traces 313 and 323), the current $I_M$ has a negative maximum value. The factor $g_m$ is the transconductance of input stage 110/120.

However, $g_m$ is a function of $V_{CM}$ so that input stage 110/120 can not maintain a linear relation over the complete range of $V_{CM}$ which—as mentioned above—is subject to changes, that is $$g_m = f(V_{CM}) \qquad (30)$$

In other words, the hysteresis of signal 20 to changes of $V_1-V_2$ (signal 15) depends on $V_{CM}$. This problem is now explained by way of example for three extreme cases.

In a first case, $V_{CM}$ has a magnitude around the potential GND of terminal 192. Transistors 121 and 122 of pair 120 (N-FET) are substantially not conducting; and transistors 111 and 112 of pair 110 (P-FETs) have high conductivities which depend on the differences between $V_1$ and $V_2$. Changes of signal 15 are linearly communicated to $I_M$ through pair 110 as in equation (28).

In a second case, $V_{CM}$ has a magnitude around the potential VCC of terminal 191. Transistors 121 and 122 of pair 120 (N-FETs) are highly conductive; and transistors 111 and 112 of pair 110 (P-FETs) are low conductive. Changes of $V_1-V_2$ are communicated to $I_M$ through pair 120 linearly. Due to the different transistor types (P-FETs and N-FETs), the magnitude of transconductance $g_m$ in the second case can be different from the magnitude of $g_m$ in the first case.

In a third case, $V_{CM}$ is between VCC and GND. The transistors of both differential pairs 110 and 120 are both conductive with medium conductivities. Changes of $V_1-V_2$ are communicated to $I_M$ through both pairs 110 and 120. To make things worse, the magnitude of transconductance $g_m$ can be doubled in comparison to the first and second cases.

The present invention provides a solution which maintains a substantially constant transconductance $g_m$ over the complete range of $V_{CM}$, that is $$g_m \neq f(V_{CM}) \qquad (32)$$

Figure 4:
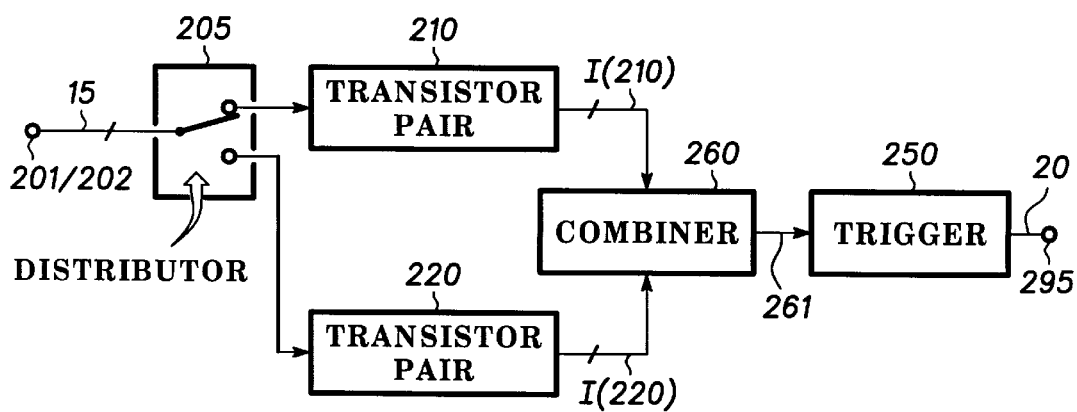
FIG. 4 is a simplified block diagram of a receiver stage according to the present invention.

FIG. 4 is a simplified block diagram of receiver stage 200 according to the present invention. Receiver stage 200 converts differential input signal 15 at input 201/202 (e.g., voltage difference $V_1-V_2$) having a first component (e.g., voltage $V_1$) and a second component (e.g., voltage $V_2$) to single output signal 20 at output 295. Output signal 20 has the same binary information as input signal 15. Preferably, receiver stage 200 comprises distributor 205, transistor pairs 210 and 220, combiner 260, and output trigger 250.

Distributor 205 (illustrated by a switch symbol) forwards differential input signal 15 to transistor pair 210 when an average magnitude (e.g., $V_{CM}$) of the first and second components is in a first magnitude range (details later, e.g., $V_{CM} \leq V_{REF}$) and forwards differential signal 15 to transistor pair 220 when the average magnitude is in a second, different magnitude range (details later, e.g., $V_{CM} > V_{REF}$).

Transistor pair 210 provides differential current $I_{(210)}$, and transistor pair 220 provides differential current $I_{(220)}$. For simplicity, FIG. 4 illustrates the differential nature of these currents by double-line symbols (slashes trough the lines). Combiner 260 provides single intermediate signal 261 which is related to the difference between differential currents $I_{(210)}$ and $I_{(220)}$. Output trigger 250 receiving intermediate signal 261 provides output signal 20.

Figure 5:
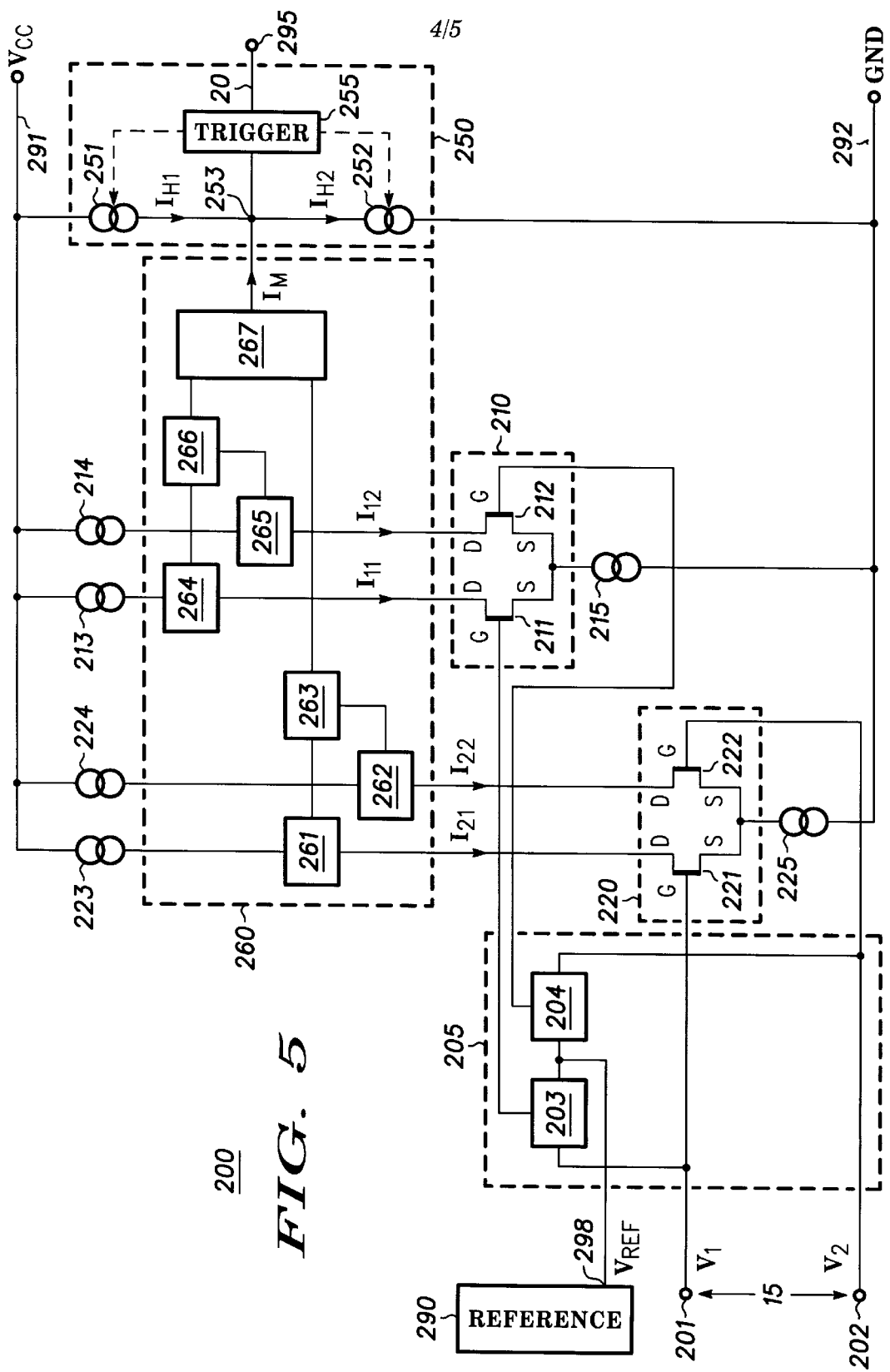
FIG. 5 is a simplified circuit diagram of the receiver stage of FIG. 4.
Figure 6:
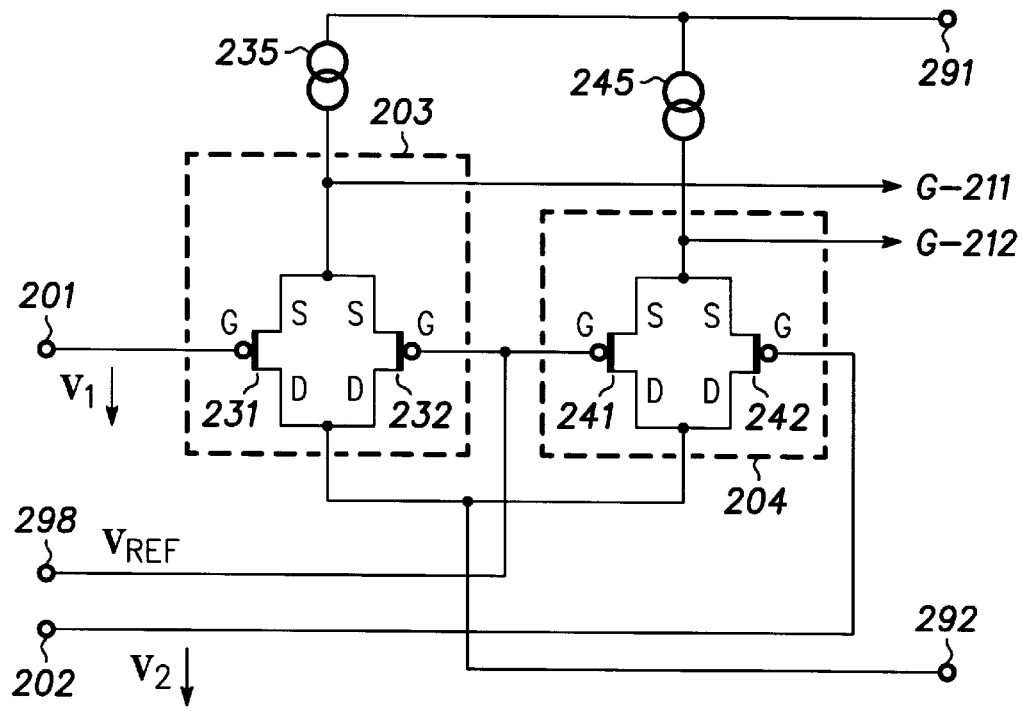
FIG. 6 is a simplified circuit diagram of a level shifter which is part of the receiver stage of FIG. 5.
Figure 7:
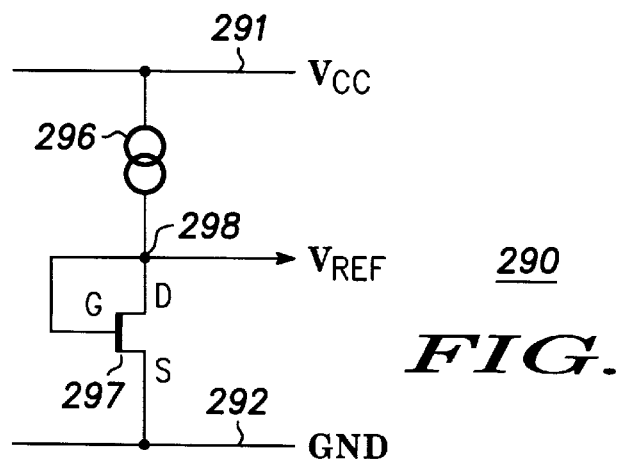
FIG. 7 is a simplified circuit diagram of a reference voltage circuit which is part of the receiver stage of FIG. 5.

Signal distributor 205 distinguishes first and second magnitude ranges by comparing the average magnitude (e.g., $V_{CM}$) to a reference value (e.g., $V_{REF}$) provided by a reference source (details in FIGS. 5–7).

By distributing the activity of converting changes of $V_1$ and $V_2$ to changes of $I_M$ by substantially either pair 210 or pair 220, unwanted effects which double the transconductance $g_m$ can be substantially be avoided. Transistor pairs (as pairs 110, 120, prior art) are no longer coupled via common currents paths. Instead, according to the present invention, transistor pairs 210 and 220 are separated. As a further advantage, transistor pair 210 and 220 both can comprise transistors of equal conductivity type (e.g., all N-FET). Details for a preferred embodiment are now explained in connection with FIGS. 5–7.

FIG. 5 is a simplified circuit diagram of receiver stage 200 with further detail. Functional blocks for distributor 205, transistor pair 210, transistor pair 220, combiner 260 and output trigger 250 (cf. FIG. 4) are illlustrates by dashed frames. In total, FIG. 5 illustrates: reference terminal 291 (VCC, e.g., 3.3 volts), reference terminal 291 (GND, e.g., zero); input 201 (voltage $V_1$ from line 1), input 202 (voltage $V_2$ from line 2, $V_1-V_2$ as signal 15); reference voltage circuit 290 (providing $V_{REF}$, details in FIG. 7), current sources 213, 214, 215, 223, 224, 225; transistor pairs 203 and 204 (illustrated by blocks, details in FIG. 6, forming distributor 205); current combining means 261–267 (forming combiner 260); current sources 251 and 252 and trigger 255 (forming latch 250, similar to latch 150 of receiver 100); transistors 211 and 212 (preferably, N-FETs, forming pair 210); and transistors 221 and 222 (preferably, also N-FETs, i.e., same conductivity type, forming pair 220).

The components are coupled as follows. Current sources 223 and 224 are coupled between reference terminal 291 and the drains D of transistors 221 and 222, respectively, of pair 220; current sources 213 and 214 are coupled between reference terminal 291 and the drains D of transistors 211 and 212, respectively, of pair 220; current sources 251 (current $I_{H1}$, cf. FIG. 3) and 252 (current $I_{H2}$) are serially coupled between reference terminals 291 and 292 via node 253. The sources S of transistors 221 and 222 (pair 220) are coupled together to current source 225 further going to reference terminal 292; the sources S of transistors 211 and 212 are coupled together to current source 215 further going to reference terminal 292. An input of trigger 255 is coupled to node 253; and the corresponding output is output 295 (signal 20). The gates G of transistors 221 and 222 (pair 220) are coupled to inputs 201 and 202, respectively, to directly receive $V_1$ and $V_2$, respectively (signal 15). The gates G of transistors 211 and 212 are coupled to inputs 201 and 202, respectively, via transistor pairs 203 and 204, respectively (details in FIG. 6), to receive a level-shifted representation of $V_1$ and $V_2$ (signal 15). Pairs 203 and 204 are further coupled to node 298 of reference circuit 290 ($V_{REF}$, details in FIGS. 6–7).

Transistors 221 and 222 of pair 220 differentially provide drain currents $I_{21}$ and $I_{22}$, respectively (corresponding to $I_{(220)}$, cf. FIG. 4); and transistors 211 and 212 of pair 210 differentially provide drain currents $I_{11}$ and $I_{12}$, respectively (corresponding to $I_{(210)}$).

Similar as in receiver 100, combiner 260 measures these drains currents (e.g., by current mirrors 261 ($I_{21}$), 262 ($I_{22}$), 244 ($I_{11}$), 265 ($I_{12}$), provides current differences (e.g., in differentiators 263 for currents $I_{21}$, $I_{22}$ and 266 for currents $I_{11}$ and $I_{12}$), and provides $I_M$ to node 253 as a function of $V_1-V_2$ in node 267). The implementation of combiner 260 as illustrated in FIG. 5 is intended to be a nonlimiting example which is not essential for the present invention.

Persons of skill in the art can provide combiner 260 by other means and can connect combiners 263, 266 and 267 in other ways to implement function $I_{21}-I_{22}+I_{11}-I_{12}$ without departing from the scope of the present invention. Those of skill in the art will also appreciate that current combiners 263, 266 and 267 can be implemented to drain or the sink the drain currents. In other words, current sources 213, 214, 223 and 224 are not essential for the present invention.

Similar as in receiver 100, latch 250 provides hysteresis. Persons of skill in the art can provide latch 250 without the need of further explanation herein, or by other means.

It is an additional and optional feature of the present invention, that current sources 251 and 252 (in latch 250) as well as current sources 223, 224, 213 and 214 can be related to reference circuit 290 (details to follow later).

FIG. 6 is a simplified circuit diagram of distributor 205 which is part of the receiver stage of FIG. 5. As already illustrated in FIG. 5, level shifter comprises pair 203 with transistors 231/232 and pair 204 with transistors 241/242. Transistors 231/232, 241/242 are of a type (preferably, P-FETs) which is opposite to the type of transistors 221/222 of pair 220 (N-FETs) and transistors 211/212 of pair 210 (also N-FETs). Current source 235 couples the sources S of transistors 231 and 232 to reference terminal 291; current source 245 couples the sources S of transistors 241 and 242 to reference terminal 291; the drains D of transistors 231/232 and 241/242 are coupled together to reference terminal 292. The sources S of transistors 231/232 are coupled to the gate of transistor 211 (of pair 210, see FIG. 5); and the sources S of transistors 241/242 are coupled to the gate of transistor 212 (of pair 220, see FIG. 5). The gate G of transistor 231 is coupled to input 201 (to receive voltage $V_1$); the gate G of transistor 242 is coupled to input 202 (to receive voltage $V_2$); and the gates G of transistors 232 and 241 are coupled together to node 298 (details in FIG. 7) of reference voltage circuit 290 to receive reference voltage $V_{REF}$. As mentioned above, depending on the magnitude of common mode voltage $V_{CM}$, transistor pairs 203 and 204 forward changes of $V_1-V_2$ to the gates of transistors 211 and 212 in pair 210. Thereby, transistor pairs 203 and 204 operates as level shifter to provide proper operation of pair 210.

Common mode voltage $V_{CM}$ (present at the gates of transistors 231 and 242) is compared to reference voltage $V_{REF}$. In the first magnitude range of $V_{CM}$ (explained above), transistors 231 and 242 are—in average—more conductive than transistors 232 and 241. Changes of $V_1$ and $V_2$ are communicated and level shifted to pair 210. Transistors 221 and 222 of pair 220 (cf. FIG. 5) receiving $V_1$ and $V_2$ without level shifting, are not active. Hence, only pair 210 substantially contributes to changes of $I_M$ (output of combiner 260).

In second magnitude range of $V_{CM}$, transistors 231 and 242 are—in average—less conductive than transistors 232 and 241. Distributor 201 communicates changes of $V_1$ and $V_2$ to pair 220 to a lesser degree as distributor 205 communicates these changes to pair 210. Hence, only pair 220 substantially contributes to changes of $I_M$.

It is an advantage of the preferred embodiment, that contributor 201 forwards voltages $V_1$ and $V_2$ to transistors 221 and 222, respectively, of pair 210 all the time. This approach save switching circuitry (transistors not conductive in first magnitude range of $V_{CM}$). Preferably, current sources 235 and 245 can be related to reference voltage circuit 290 (details to follow).

FIG. 7 is a simplified circuit diagram of reference voltage circuit 290 which is part of the receiver stage of FIG. 5. Circuit 290 has current source 296 coupled between reference terminal 291 and node 298 (reference voltage $V_{REF}$) and transistors 297 (preferably, N-FET) having drain D and gate G at node 298 and source S at reference terminal 292.

Preferably, current source 296 of reference circuit 290 serves as a scaling reference for some or all of current sources 215, 225 (sources at pairs 210, 220), 223, 224 (supply for pair 220), 213, 214 (supply for pair 210), 251 and 252 (latch 250), 235 and 245 (supply for pairs 203, 204, respectively in combiner 201).

The present invention is now summarized as a low-voltage differential signal (LVDS) receiver (e.g., receiver 200) for converting a differential input signal (e.g., signal 15) represented by a voltage difference (i.e., a signal on two inputs 201/202, e.g., $V_1-V_2$) to a single output signal (e.g., a signal on a single output, e.g., output 295). The receiver comprises:

first and second transistor pairs (e.g., pairs 220 and 210, preferably, same conductivity type, e.g., N-FET) for providing first (e.g., $I_{(220)}$) and second (e.g., $I_{(210)}$) intermediate differential current signals;

a signal distributor (e.g., implemented by the lines between inputs 201/202 and the gates of transistors 221/222 of pair 220, and by transistors 231, 232, 241, 242 coupled to the gates of transistors 211/212 of pair 210) for either forwarding the differential input signal to the first transistor pair (e.g., pair 220) when the common mode voltage (e.g., $V_{CM}=V_1+V_2/2$) of the input signal is in a first magnitude relation (e.g., larger) to a reference voltage (e.g., $V_{REF}$) or otherwise forwarding the differential input signal to the second transistor pair (e.g., pair 210);

an arrangement (e.g., combiner 260 with elements 261–267) for deriving an intermediate single current signal (i.e., signal on a single wire, e.g., $I_M$) from the first and second intermediate differential current signals; and an output trigger (e.g., trigger 255) for transferring the intermediate differential current signal to the output signal (preferably, applying hysteresis, e.g., by controlling current sources 251, 252).

Having described details in terms of a preferred embodiment, the present invention is now summarized as a method for converting a differential input signal (e.g., signal 15) having a first component (e.g., voltage $V_1$) and a second component (e.g., voltage $V_2$) to a single output signal (e.g., signal 20) without changing the binary information of the signals. The method comprises the step of:

receiving the input signal (e.g., by distributor 205 having transistor pairs 203, 204);

depending on a relation between an average magnitude (e.g., $V_{CM}$ as defined in equation (14)) of both components to a reference magnitude (e.g., $V_{REF}$ as provided by reference circuit 290 and applied to distributor 205), selectively forwarding the (differential) input signal to either a first transistor pair (e.g., pair 220) or a second transistor pair (e.g., pair 210);

providing a first differential current (e.g., $I_{(220)}$) by the first transistor pair and a second differential current (e.g., $I_{(210)}$) by the second transistor pair;

relating the difference between both differential currents ($I_{(220)}$ and $I_{(210)}$) to a single intermediate signal (e.g., single current $I_M$ by combiner 260); and triggering the intermediate signal to the output signal (cf. trigger 250, preferably, introducing hysteresis).

The following additional method features are applied in the preferred embodiment (cf. FIGS. 5–7): In the providing step, the transistors (e.g., 221, 222) used in the first transistor pair (e.g., pair 220) and the transistors (e.g., 211, 212) used in the second transistor pair (e.g., pair 210) are transistors of equal conductivity type (e.g., N-FETs). In the selectively forwarding step, a signal distributor (e.g., comprising transistors 231, 232, 241, 242) forwards first and second components (of the input signal, e.g., $V_1$, $V_2$) with an substantially unchanged signal level to the first transistor pair (illustrated in FIG. 5 by direct lines from inputs 201/202 to the gates of transistors 221/222 of pair 220), and forwards the first and second components (e.g., $V_1$, $V_2$) with substantially shifted signal level (e.g., illustrated in FIGS. 5–6 by lines from sources 231/232 and 241/242 to the gates of transistors 211 and 212) to the second transistor pair (e.g., pair 210). This result in the following operating modes: When the average magnitude (of input components) is in a first relation to the reference magnitude (e.g., $V_{CM} > V_{REF}$), then the first differential current (e.g., $I_{(220)}$) has substantially different current components (e.g., $I_{21} \neq I_{22}$) and the second differential current (e.g., $I_{(210)}$) has substantially equal current components (e.g., $I_{11} \approx I_{12}$). Otherwise, when the average magnitude is in a second, opposite relation to the reference magnitude (e.g., $V_{CM} < V_{REF}$), than the first differential current (e.g., $I_{(220)}$) has substantially equal current components (e.g., $I_{21} \approx I_{22}$) and the second differential current (e.g., $I_{(210)}$) has substantially different current components (e.g., $I_{11} \neq I_{12}$).

While the invention has been described in terms of particular structures, devices and methods, those of skill in the art will understand based on the description herein that it is not limited merely to such examples and that the full scope of the invention is properly determined by the claims that follow.

What is claimed is:

1. An apparatus for converting a differential input signal having a first component and a second component to a single output signal, said output signal having the same binary information as said input signal, said apparatus comprising:
   a first pair of transistors providing a first differential current;
   a second pair of transistors providing a second differential current;
   a combiner for providing a single intermediate signal which is related to the difference between said first and second differential currents;
   a signal distributor for forwarding said differential input signal to said first pair of transistors when an average magnitude of said first and second components is in a first magnitude range, and for forwarding said differential signal to said second pair of transistors when said average magnitude is in a second, different magnitude range, and
   an output trigger for receiving said single intermediate signal to provide said output signal.

2. The apparatus of claim 1 wherein said output trigger provides said output signal with a predetermined hysteresis to said intermediate signal.

3. The apparatus of claim 2 wherein said first pair of transistors, said second pair of transistors and said combiner provide that said intermediate signal changes substantially linearly to the a magnitude difference between said first and second components.

4. The apparatus of claim 1 wherein said signal distributor distinguishes said first magnitude range and said second magnitude range by comparing said average magnitude to a reference value provided by a reference circuit.

5. The apparatus of claim 4 wherein said first pair of transistors receives supply from a first pair of current sources, said second pair of transistors receives supply from a second pair of current sources, and said reference circuit receives supply from a further current source which is scaled to the current sources of said first and second pairs of current sources.

6. The apparatus of claim 4 wherein said reference circuit is a voltage reference circuit.

7. The apparatus of claim 1 wherein said first pair of transistors and said second pair of transistors both comprise transistors of equal conductivity type.

8. The apparatus of claim 7 wherein said transistors of equal conductivity type are N-channel field effect transistors.

9. The apparatus of claim 7 wherein said signal distributor distinguishes said first and second magnitude ranges by comparing said average magnitude to a reference voltage which is related to a threshold voltage and a saturation voltage of the transistors in the transistor pairs.

10. The apparatus of claim 9 wherein said reference voltage is the sum of said threshold voltage and said saturation voltage.

11. The apparatus of claim 1 wherein said average magnitude is an arithmetic average magnitude.

12. The apparatus of claim 1 wherein said signal distributor provides level shifting of said input signal.

13. A method for converting a differential input signal having a first component and a second component to a single output signal, wherein said output signal has the same binary information as said input signal, said method comprising the step of:
    receiving said input signal;
    depending on a relation between an average magnitude of said first and second components to a reference magnitude, selectively forwarding said input signal to either a first transistor pair or said second transistor pair;
    providing a first differential current by said first transistor pair and a second differential current by a second transistor pair;
    relating the difference between said first and second differential currents to a single intermediate signal; and
    triggering said intermediate signal to said output signal.

14. The method of claim 13 wherein in said providing step, the transistors used in said first transistor pair and the transistors used in said second transistor pair are transistors of equal conductivity type.

15. The method of claim 13 wherein in said selectively forwarding step, a signal distributor forwards said first and second components with an substantially unchanged signal level to said first transistor pair, and forwards said first and second components with substantially shifted signal level to said second transistor pair so that in a first relation of said average magnitude to said reference magnitude, said first differential current has substantially different current components and said second differential current has substantially equal current components, and in a second relation of said average magnitude to said reference magnitude, said first differential current has substantially equal current components and said second differential current has substantially different current components.

16. A low-voltage differential signal (LVDS) receiver for converting a differential input signal represented by a voltage difference to a single output signal, said receiver comprising:

first and second transistor pairs for providing first and second intermediate differential current signals;

a signal distributor for either forwarding the differential input signal to the first transistor pair when the common mode voltage of the input signal is in a first magnitude relation to a reference voltage or otherwise forwarding the differential input signal to the second transistor pair;

an arrangement for deriving an intermediate single current signal from said first and second intermediate differential current signals; and an output trigger for transferring said intermediate differential current signal to said output signal.

17. The LVDS receiver of claim 16 wherein said first and second transistor pairs comprise transistors of the same conductivity type.

18. The LVDS receiver of claim 17 wherein said transistors in said transistor pairs are N-channel field effect transistors.

19. The LVDS receiver of claim 16 wherein said output trigger applies hysteresis.

* * * * *